(12) United States Patent
Lamik et al.

(10) Patent No.: US 8,899,629 B2
(45) Date of Patent: Dec. 2, 2014

(54) CONNECTION BETWEEN A DRILL PIPE AND A CONNECTOR

(75) Inventors: Abdelrhani Lamik, Leoben (AT); Bouchra Lamik-Thonhauser, St. Peter-Freienstein (AT); Robert Karpf, Bruck/Mur (AT)

(73) Assignee: Think and Vision GmbH, Leoben (AT)

( * ) Notice: Subject to any disclaimer, the term of this patent is extended or adjusted under 35 U.S.C. 154(b) by 127 days.

(21) Appl. No.: 13/127,146

(22) PCT Filed: Jun. 8, 2010

(86) PCT No.: PCT/AT2010/000201
§ 371 (c)(1),
(2), (4) Date: May 2, 2011

(87) PCT Pub. No.: WO2010/141968
PCT Pub. Date: Dec. 16, 2010

(65) Prior Publication Data
US 2011/0215569 A1 Sep. 8, 2011

(30) Foreign Application Priority Data
Jun. 8, 2009 (AT) .................................. A 882/2009

(51) Int. Cl.
*F16L 31/00* (2006.01)
*F16L 13/10* (2006.01)
*E21B 17/04* (2006.01)
*F16L 47/24* (2006.01)
*F16L 47/04* (2006.01)

(52) U.S. Cl.
CPC ............... *E21B 17/04* (2013.01); *F16L 13/103* (2013.01); *F16L 47/24* (2013.01); *F16L 47/04* (2013.01)

USPC .......................................... 285/222.1; 285/245

(58) Field of Classification Search
USPC ............ 285/342, 245, 255, 222.1–222.5, 343
See application file for complete search history.

(56) References Cited

U.S. PATENT DOCUMENTS

| 1,051,046 | A | * | 1/1913 | Witzenmann | ............... | 285/222.4 |
| 2,394,632 | A | * | 2/1946 | Parker | .................. | 285/222.1 |
| 2,462,323 | A | * | 2/1949 | Hurst | ..................... | 285/250 |
| 2,828,945 | A | * | 4/1958 | New | ...................... | 175/93 |
| 3,008,736 | A | * | 11/1961 | Samiran | ................. | 285/222.5 |

(Continued)

FOREIGN PATENT DOCUMENTS

| DE | 4209795 A1 | * | 9/1993 | ............ | F16L 33/22 |
| EP | 239338 A2 | * | 9/1987 | ............ | F16L 47/00 |
| GB | 2119465 A | * | 11/1983 | ............ | F16L 33/23 |
| WO | 99/17045 A1 | | 4/1999 | | |

OTHER PUBLICATIONS

International Search Report, dated Dec. 28, 2010, from corresponding PCT application.

*Primary Examiner* — Aaron Dunwoody
(74) *Attorney, Agent, or Firm* — Young & Thompson

(57) ABSTRACT

A connection between a drill pipe (1) made of carbon- or glass fiber-reinforced plastic and a tubular, preferably metal connector (2) that is partially held in one end (3) of the drill pipe (1) and is cemented to it is characterized in that a thrust element (8) that is positively connected to the connector (2) in the region of the end (3) of the drill pipe (1), in which the connector (2) is held, presses on the outside of the end (3) of the drill pipe (1).

18 Claims, 6 Drawing Sheets

(56) References Cited

U.S. PATENT DOCUMENTS

| | | | |
|---|---|---|---|
| 3,222,091 A * | 12/1965 | Marshall | 285/95 |
| 3,415,545 A * | 12/1968 | Frey et al. | 285/222.1 |
| 3,936,118 A * | 2/1976 | Thiery et al. | 439/191 |
| 4,000,920 A * | 1/1977 | Horvath et al. | 285/222.4 |
| 4,548,428 A | 10/1985 | Ruhle | |
| 4,810,010 A | 3/1989 | Jones | |
| 4,875,717 A * | 10/1989 | Policelli | 285/222.1 |
| 4,950,001 A | 8/1990 | Briggs | |
| 5,028,081 A * | 7/1991 | Fournier | 285/334.4 |
| 5,332,049 A | 7/1994 | Tew | |
| 6,161,880 A * | 12/2000 | Peppel | 285/340 |
| 7,105,249 B2 * | 9/2006 | Hall et al. | 429/176 |
| 7,458,617 B2 * | 12/2008 | Leslie et al. | 285/390 |
| 7,766,101 B2 * | 8/2010 | Clark | 175/257 |
| 2004/0219831 A1 | 11/2004 | Hall et al. | |
| 2004/0248001 A1 * | 12/2004 | Hall et al. | 429/176 |
| 2005/0099004 A1 * | 5/2005 | Bouey et al. | 285/249 |
| 2008/0066961 A1 * | 3/2008 | Aivalis et al. | 175/50 |
| 2008/0158005 A1 * | 7/2008 | Santoso et al. | 340/854.4 |
| 2008/0314585 A1 * | 12/2008 | Clark | 166/250.17 |

* cited by examiner

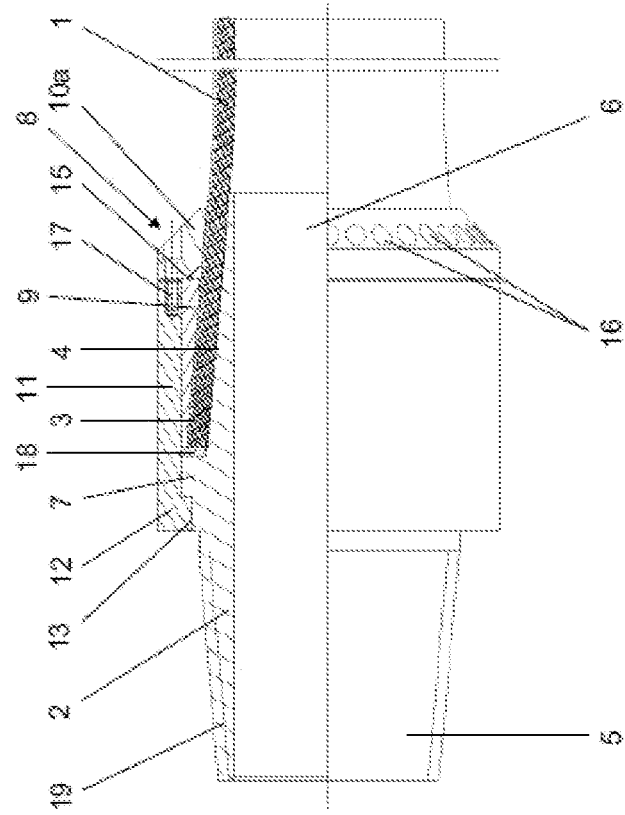

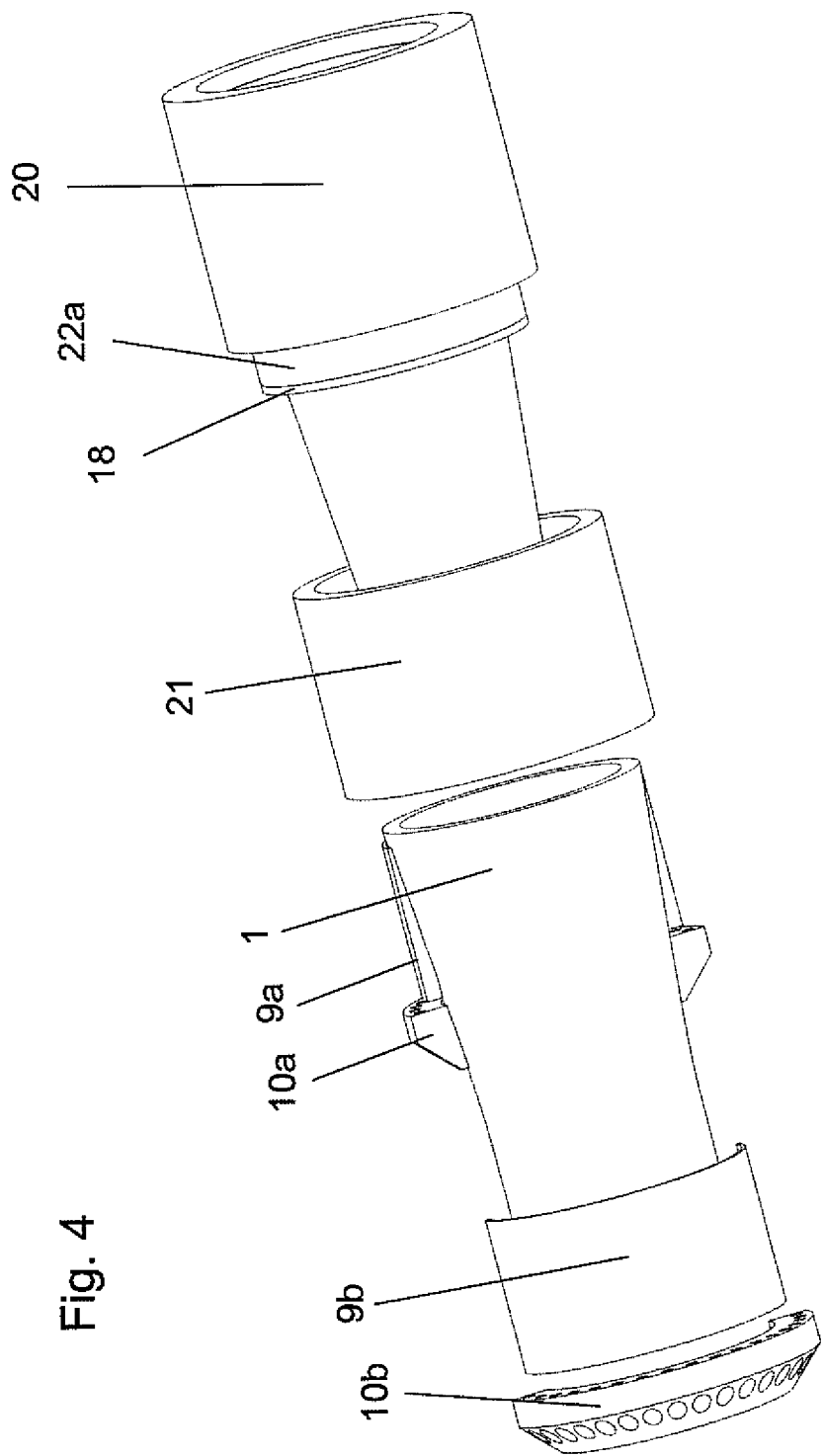

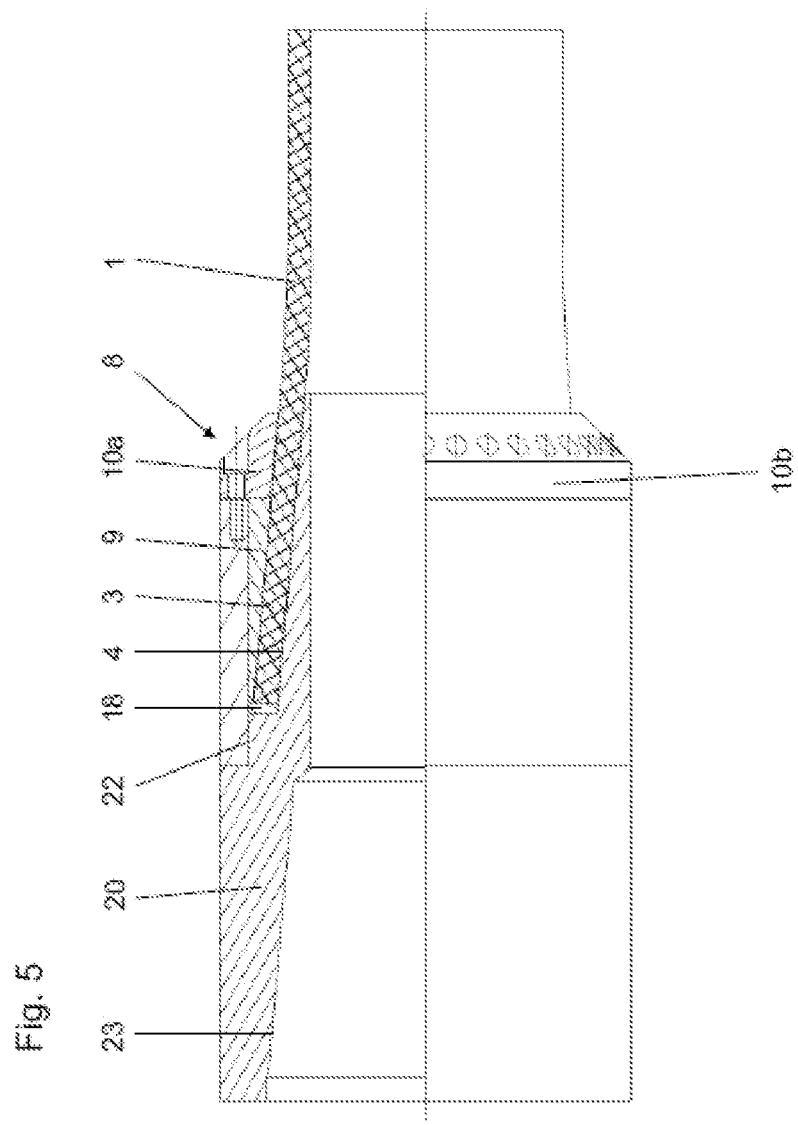

CONNECTION BETWEEN A DRILL PIPE AND A CONNECTOR

BACKGROUND OF THE INVENTION

1. Field of the Invention

The invention relates to a connection between a drill pipe made of carbon- or glass fiber-reinforced plastic and a tubular, preferably metal connector that is partially held in one end of the drill pipe and is cemented to it.

2. Description of the Related Art

Continuing use of the existing infrastructure on land as well as "off-shore" requires drilling deeper or further. There is a series of applications that would use horizontal distance drilling, i.e., to deliver more petroleum from an existing field from existing platforms and to increase the degree of petroleum displacement of the depots.

The horizontal distance drilling is largely limited by the weight and the "normal force" of the drill string that determines the friction forces. Here, the tensile loading or buckling is adversely affected, and wellbore hydraulics (flow velocity compared to pressure losses) is largely limited by the limited diameter selection.

In this connection, bores of up to a distance of roughly 12 km are the limit that can be reached with the currently predominant material "steel" and the drilling technique used at present. The situation is similar for deep bores where the inherent weight of the string limits the depth, and bores beyond 8 km entail the greatest risk. Aluminum as a drill string material has not solved this problem and is rarely used. Glass or carbon fiber-reinforced plastics ("composites") are alternatives.

One major factor that impedes the use of CFK or GFK drilling columns is ensuring a durable connection between the CFK or GFK pipe and the steel connector.

A known CFK drilling column that tries to solve this problem is described in U.S. Pat. No. 5,332,049 A. With this drilling column, the drilling of curved bores with a short radius of curvature with a limited range is enabled. U.S. Pat. No. 5,332,049 A shows a method for transfer of loads between a CFK pipe and a metal connector. The connection is ensured by simultaneous use of cements and pins.

The type of fastening according to U.S. Pat. No. 5,332,049 A, however, shows a series of disadvantages. The use of cement and pins leads to loss of the drill string in case of failure, and thus there is no possibility of retrieving the drill string from the drill hole. There is no effective method for ensuring that the cement is uniformly distributed and uniformly loaded. Moreover, failure of the connection as a result of torsion loading automatically leads to destruction of the axial load bearing capacity of the drilling column and thus to separation of the connection. Due to the different material properties (GFK or CFK and steel), the strength of the connection is limited. The expansion range of the GFK or CFK material cannot be tolerated by the steel connector. This leads to the maximum shear stress (stress concentration) being located at the steel-CFK or CFK transition. An increase of axial loading leads to a rise of local shear stresses. Subsequently, local failure of the adhesive connection occurs, which in turn leads to the rapid spread of the fault up to complete failure of the connection. Efforts to increase strength by increasing the adhesive length are largely in vain, since the local stress concentration at the GFK-steel or CFK-steel transition is only minimally dependent on the adhesive length.

WO 99/17045 A shows an improved CFK drill string. One part of this development is the connection between the steel connector and the CFK drill string. This type of fastening likewise has some disadvantages. There is a high stress concentration on the groove base both for CFK pipe and also for the steel connector. Under dynamic stresses, this leads to crack formation, crack propagation, and finally to complete failure of the connection. The complex production method makes it almost impossible to integrate this method into a continuous process, for example the so-called "pullwinding." To increase the axial bearing capacity, grooves were made on the connector surface. They lead to poorer contact between the CFK pipe and the steel connector. Ensuring tightness under high pressure is doubtful. Both the axial and also the tangential grooves lead to inevitable curvature of the carbon fibers; this leads to complex loads (complex stress state) on the fibers.

BRIEF SUMMARY OF THE INVENTION

Therefore, the object of this invention is to create a new possibility for the connection between a CFK/GFK drill pipe and a tubular, preferably metal connector.

This object is achieved in a connection of the initially named type in that a thrust element that is positively connected to the connector in the region of the end of the drill pipe in which the connector is held presses on the outside of the end of the drill pipe.

In the invention, the transfer of loads from the CFK pipe to the connector in addition to the cement connection is ensured by a thrust element that is made preferably as a clamp connection. The combination of the mechanical connection and the cement connection leads to high safety against slipping through and loss of the drill string. The force is transferred, differently than in the prior art, simultaneously via the outside and inside of the drill pipe. This leads to much lower loading of the cement connection.

One preferred embodiment of the invention is characterized in that a contact surface between the end of the drill pipe and the connector widens conically toward the end of the drill pipe. This form of mechanical connection ensures that loss of the drill string does not occur even if the cement connection fails in the least favorable case.

BRIEF DESCRIPTION OF THE DRAWINGS

Preferred embodiments of the invention are the subject matter of the other dependent claims.

One preferred embodiment of the invention is described in more detail below with reference to the drawings.

Figure 1:
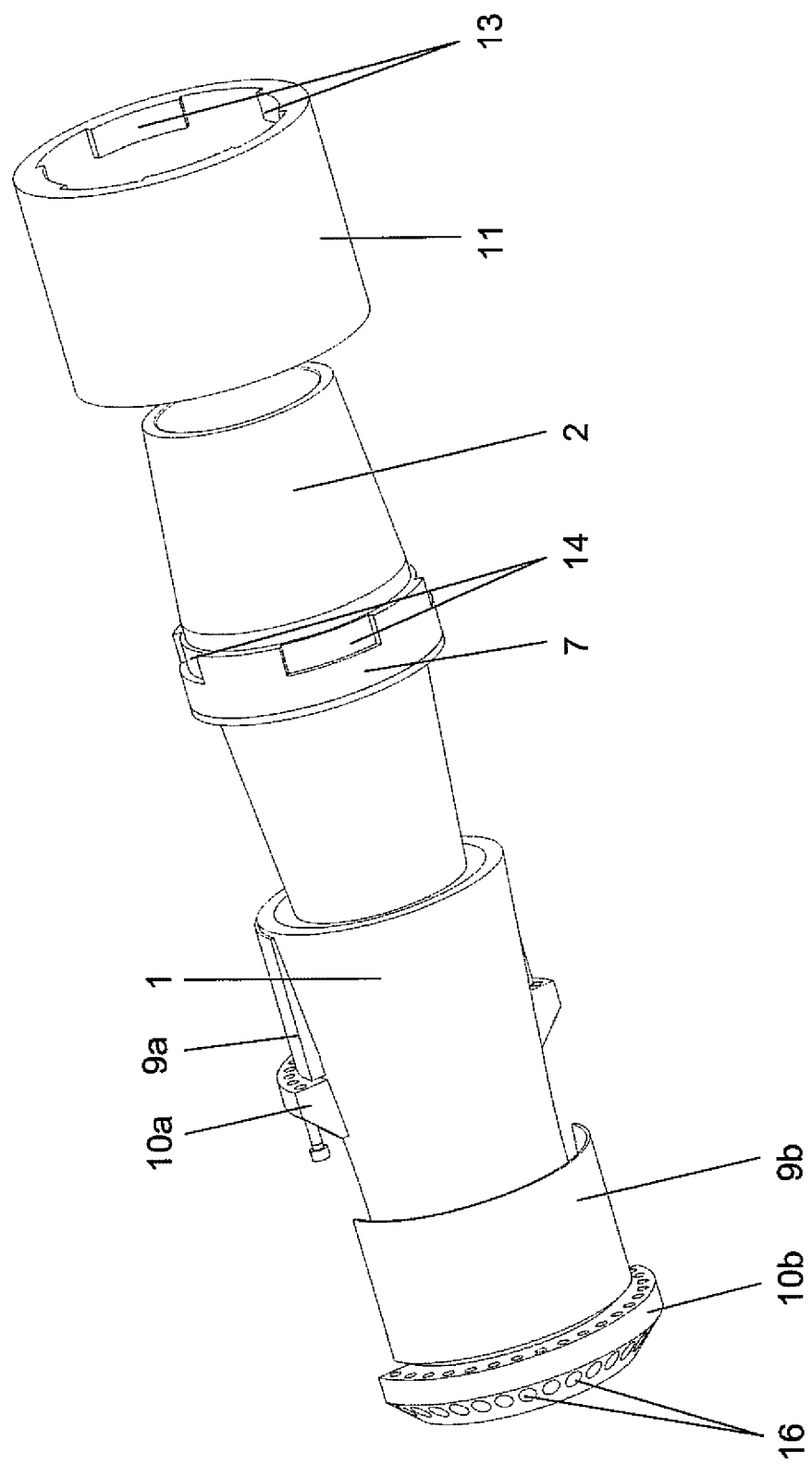
Figure 6:
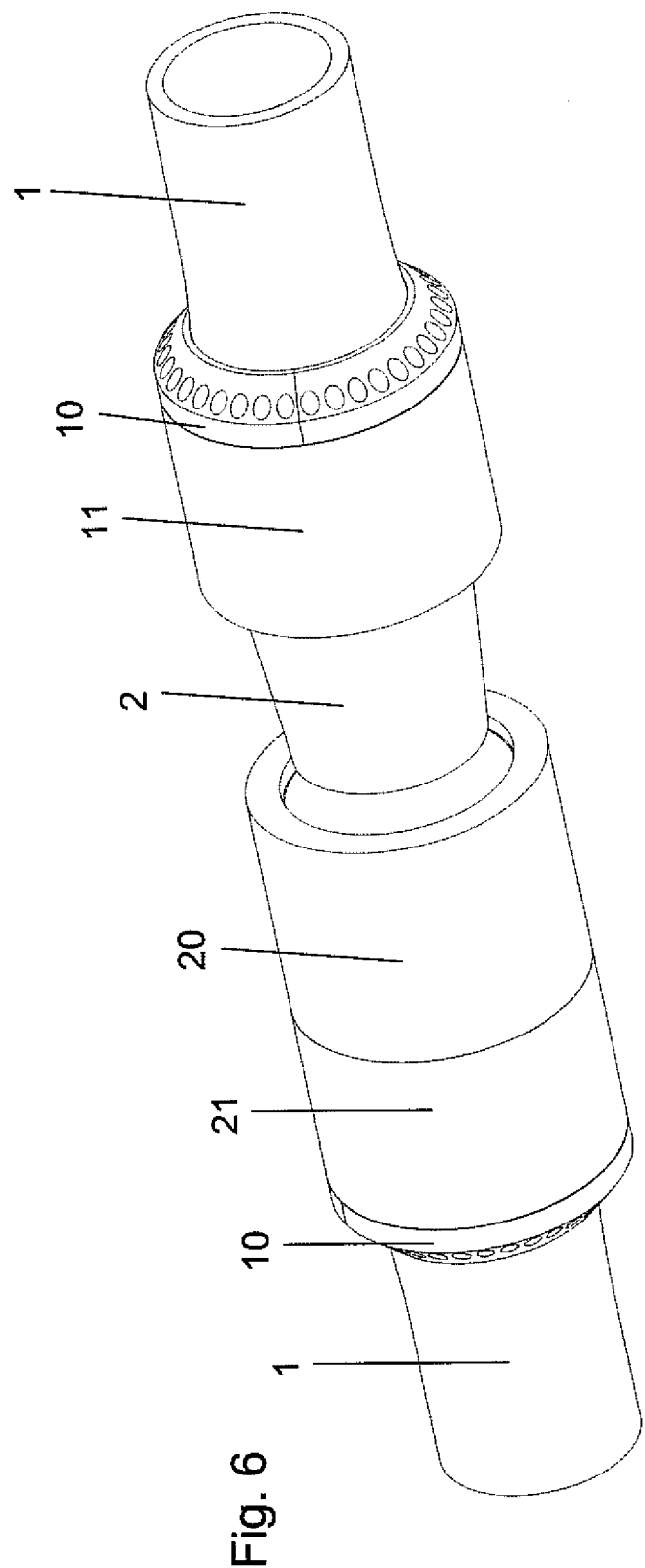
Figure 7:
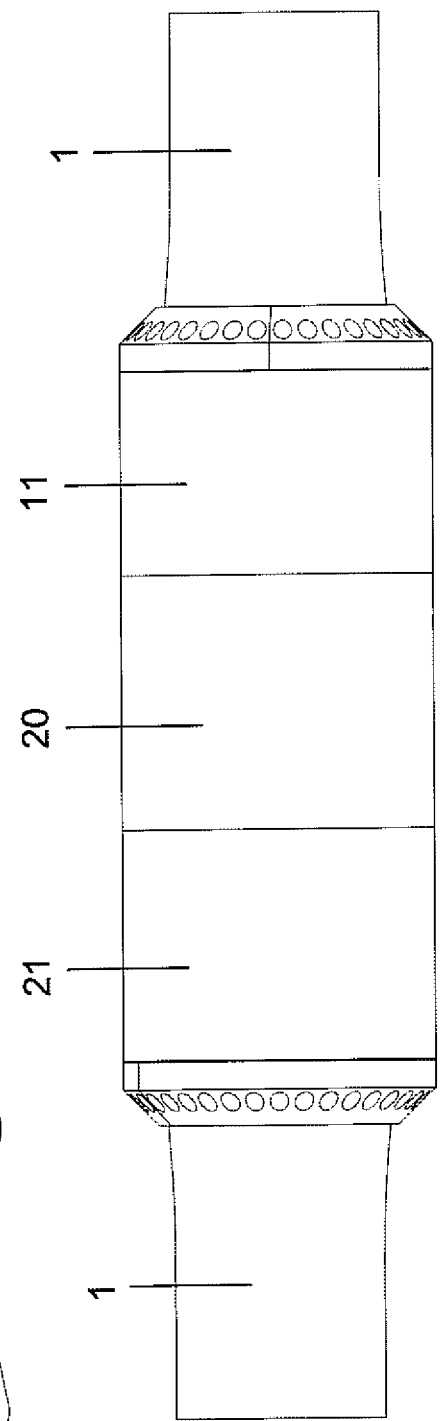
Figure 8:
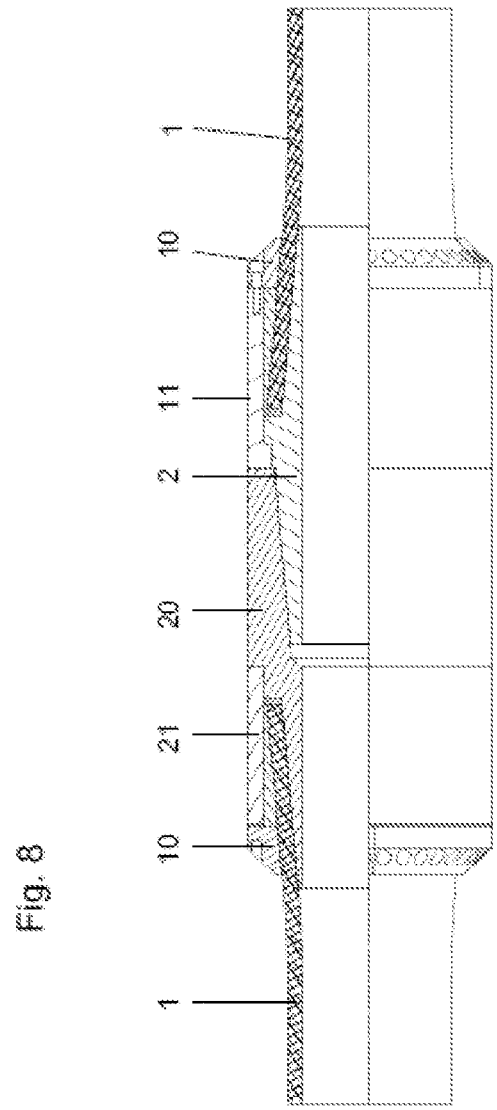

Here:

FIG. 1 shows a connection according to the invention in an exploded view,

FIG. 2 shows a partial lengthwise cross-section through the connection according to the invention in the assembled state, FIG. 3 shows a front view of the connection according to FIG. 2 from the left, FIG. 4 shows a second embodiment, a connection according to the invention in an exploded view [sic], FIG. 5 shows a partial lengthwise cross-section through the connection from FIG. 4 in the assembled state, FIG. 6 shows the two connectors in an oblique projection prior to assembly, FIG. 7 shows the two connectors in the assembled state, and FIG. 8 shows the two connectors in the assembled state partially in cross-section.

DETAILED DESCRIPTION OF THE PREFERRED EMBODIMENTS

The drawings show one embodiment of the invention that has a drill pipe 1 made of carbon- or glass fiber-reinforced plastic and a tubular connector 2 that preferably consists of a metal such as high-grade steel and that is held partially in one end 3 of the drill pipe 1 and is cemented to it on the contact surface 4 between the end 3 of the drill pipe 1 and the connector 2. The invention, however, can also be used in drill pipes and connectors of other materials. The connector 2 is made tubular and has an inside diameter that corresponds roughly to the inside diameter of the drill pipe 1. The connector 2 on both sides has an outside diameter that tapers conically toward its ends 5, 6 and in its middle has a ring-shaped bead 7. To the extent the outside diameter of the connector 2 decreases toward its end 6 that is held in the end 3 of the drill pipe 1, the end 3 of the drill pipe 1 widens.

In addition to the cement connection on the contact surface 4 between the connector 2 and the drill pipe 1, there is a positive and a nonpositive connection between these two parts in the form of a thrust element 8. The thrust element 8 consists essentially of a sleeve 9 that is wedge-shaped in cross-section and that in the embodiment depicted consists of two semicircular parts 9a, 9b, of a thrust ring 10 that in this embodiment likewise consists of two semicircular parts 10a, 10b, and of an outer sleeve 11. The wedge-shaped sleeve 9 has a cylindrical outer surface and a conical inner surface, the angle of taper of the inner surface corresponding to the angle of taper of the outside of the end 3 of the drill pipe 1. The two parts 9a, 9b of the sleeve 9 in the assembled state of the connection according to the invention are preferably likewise cemented to the end 3 of the drill pipe 1.

The outer sleeve 11 on one end 12 has projections 13 that project to the inside and that engage depressions 14 on the bead 7 and are supported on the contact surfaces formed by the depressions 14 both in the axial direction and also in the peripheral direction. The either one-piece thrust ring 10a or the thrust ring 10b that consists of two parts as in the embodiment depicted adjoins an opposite surface 15 of the wedge-shaped sleeve 9, which surface is pointed at a right angle to the longitudinal axis of the drill pipe 1 in the embodiment depicted and is permanently connected to the outer sleeve 11 by means of screws that are not shown and that are inserted through bores 16 in the thrust ring 10a, 10b and that are screwed into threaded bores 17 in the outer sleeve 11.

When the screws are securely tightened, the wedge-shaped sleeve 9 is pressed securely into the wedge-shaped gap between the end 3 of the drill pipe 1 and the outer sleeve 11, since the outer sleeve 11 is supported on the opposite side of the bead 7. In this way, the wedge-shaped sleeve 9 of the thrust element 8 is pressed tightly against the outer surface of the end 3 of the drill pipe 1, and the latter is subsequently pressed tightly against the connector 2. Thus, the end 3 is tightly clamped directly between the wedge-shaped sleeve 9 of the thrust element 8 and the underlying end 6 of the connector 2. These parts can likewise be cemented to one another in order to create an additional, strong connection between the wedge-shaped sleeve 9 and the outer sleeve 11.

In order to ensure tightness between the drill pipe 1 and the connector 2, there is a gasket 18 between the face surface of the end 3 of the drill pipe 1 and the bead 7 of the connector 2.

A thread 19 is attached to the conical periphery of the end 5 of the connector 2; the thread is used for connection to a second connector 20 that, as shown in FIGS. 4 and 5, is attached to another drill pipe 1 that is to be connected. On the connector 20, analogously as on the connector 2, a drill pipe 1 that widens conically on the end 3 is cemented to a contact surface 4. Furthermore, as in a connector 2 in addition to the cement connection on the contact surface 4 between the connector 2 and the drill pipe 1, there is a positive and nonpositive connection between these two parts in the form of a thrust element 8. The thrust element 8 as described above consists essentially of a sleeve 9 that is wedge-shaped in cross-section and that in the embodiment depicted consists of two semicircular parts 9a, 9b, of a thrust ring 10 that in the embodiment depicted likewise consists of two semicircular parts 10a, 10b, and of an outer sleeve 21. The wedge-shaped sleeve 9 has a cylindrical outer surface and a conical inner surface, the angle of taper of the inner surface corresponding to the angle of taper of the outside of the end 3 of the drill pipe 1. The two parts 9a, 9b of the sleeve 9 in the assembled state of the connection according to the invention are preferably likewise cemented to the end 3 of the drill pipe 1.

The outer sleeve 21 on one end has an internal thread 22 with which it is screwed to an external thread 22a on the connector 20. The either one-piece thrust ring 10a or the thrust ring 10b that consists of two parts in the embodiment depicted adjoins an opposite surface 15 of the wedge-shaped sleeve 9, which surface is pointed at a right angle to the longitudinal axis of the drill pipe 1 in the embodiment depicted and is permanently connected to the outer sleeve 21 by means of screws that are not shown and that are inserted through bores 16 in the thrust ring 10a, 10b and that are screwed into threaded bores 17 in the outer sleeve 21.

The connector 20 on its end opposite the drill pipe 1 has a conical internal thread 23 that widens to the outside and with which it is screwed to the external thread 19 of the first connector 2. FIG. 6 shows the two connectors 2, 20 in an oblique projection before assembly. FIGS. 7 and 8 show the two connectors 2, 20 with the drill pipes 1 attached to them in the assembled state.

The connection according to the invention has the following advantages, among others:

- The connection between the drill pipe 1 and the connectors 2, 20 is at the same time a positive, nonpositive and integral connection. The combination of a positive and nonpositive connection and adhesive connection leads to high safety against slipping through and loss of the drill string. The positive and nonpositive connection ensures that the drill string is not lost even if the cement connection fails in the least favorable case and slips due to torsional loading.
- The force is transferred, differently than in the prior art, simultaneously via the outside and inside of the drill pipe 1. This leads to much lower loading of the cement connection.
- The drill pipe 1 can be produced in a continuous process, for example pullwinding, since the drill pipe 1 on its end can be made smooth or without finishing. This yields higher and more uniform quality; this is of great importance for the design and failure prediction.
- It is possible to carry out the assembly process in a separate process, as a result of which automated assembly is possible.

The invention claimed is:

1. A connection assembly, comprising:
   - a connection between a drill pipe made of carbon- or glass fiber-reinforced plastic and a tubular, metal connector that is partially held in one end of the drill pipe and is cemented to the drill pipe; and
   - a thrust element that is positively connected to the connector in a region of an end of the drill pipe in which the connector is held and which presses on an outside of the end of the drill pipe, the thrust element including an outer sleeve with bores that rests on the outside of the end of the drill pipe and has an opposing surface that is adjoined by a thrust ring with bores, the thrust ring being connected to the outer sleeve by screws inserted through the thrust ring bores and screwed into the outer sleeve bores to hold the drill pipe against the connector, the thrust ring bores and the outer sleeve bores being substantially parallel to a longitudinal axis of the drill pipe, wherein a contact surface between the end of the drill pipe and the connector widens conically toward the end of the drill pipe, wherein the thrust element has a wedge-shaped sleeve that rests on the outside of the end of the drill pipe and has an opposing surface that is adjoined by the thrust ring, the thrust ring being positively connected to the connector.

2. The connection assembly according to claim 1, wherein the opposing surface is aligned at an angle of roughly 90° to the lengthwise extension of the drill pipe.

3. The connection assembly according to claim 2, wherein the wedge-shaped sleeve has an outer surface that is essentially cylindrical.

4. The connection assembly according to claim 1, wherein the wedge-shaped sleeve has an outer surface that is essentially cylindrical.

5. The connection assembly according to claim 4, wherein the outer sleeve acts positively on the connector.

6. The connection assembly according to claim 5, wherein the outer surface of the wedge-shaped sleeve adjoins the inner surface of the outer sleeve.

7. The connection assembly according to claim 6, wherein the connector has a ring-shaped bead with a contact surface on which the outer sleeve is supported on the side opposite the thrust ring.

8. The connection assembly according to claim 5, wherein the connector has a ring-shaped bead with a contact surface on which the outer sleeve is supported on a side opposite the thrust ring.

9. The connection assembly according to claim 8, wherein the outer sleeve on one end has projections that project to the inside and that engage in depressions on the bead and are supported there both in the axial direction and in the peripheral direction.

10. The connection assembly according to claim 5, wherein the outer sleeve is screwed to the connector.

11. The connection assembly according to claim 5, wherein the wedge-shaped sleeve is cemented to the outer sleeve.

12. The connection according to claim 1, wherein a gasket is provided between the end at the face surface of the drill pipe and the connector.

13. The connection assembly according to claim 1, wherein the gasket comprises two semicircular parts.

14. The connection assembly according to claim 1, wherein the wedge-shaped sleeve comprises two semicircular parts.

15. The connection assembly according to claim 1, wherein the wedge-shaped sleeve is cemented to the drill pipe.

16. The connection assembly according to claim 1, further comprising two connectors connected by screws, at least one of the two connectors comprising the tubular, metal connector.

17. The connection assembly according to claim 16, wherein one, first connector has a conical external thread, and a second connector has a conical internal thread.

18. The connection assembly according to claim 1, wherein the thrust element has a wedge-shaped sleeve that rests on the outside of the end of the drill pipe and has an opposing surface that is adjoined by the thrust ring, the thrust ring being positively connected to the connector.

* * * * *